United States Patent
Hunt (10) Patent No.: US 9,106,720 B1
(45) Date of Patent: Aug. 11, 2015

(54) PERSONALIZED SMART-LIST VIDEO CHANNELS

(71) Applicant: Amazon Technologies, Inc., Reno, NV (US)

(72) Inventor: Lewis Anthony Hunt, Ashford Kent (GB)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 13/732,735

(22) Filed: Jan. 2, 2013

(51) Int. Cl.
*G06F 15/16* (2006.01)
*H04L 29/06* (2006.01)
*H04L 29/08* (2006.01)

(52) U.S. Cl.
CPC .............. *H04L 65/60* (2013.01); *H04L 67/30* (2013.01)

(58) Field of Classification Search
CPC ...................................................... H04L 65/60
USPC ........................................... 709/219, 223, 227
See application file for complete search history.

(56) References Cited

U.S. PATENT DOCUMENTS

| | | | |
|---|---|---|---|
| 2008/0086570 A1* | 4/2008 | Dey et al. ...................... | 709/231 |
| 2013/0219076 A1* | 8/2013 | Islam et al. ................... | 709/231 |
| 2014/0033256 A1* | 1/2014 | Cox et al. ...................... | 725/46 |

* cited by examiner

*Primary Examiner* — Yves Dalencourt
*Assistant Examiner* — Sahera Halim
(74) *Attorney, Agent, or Firm* — Thomas | Horstemeyer, LLP (57) ABSTRACT

Disclosed are various embodiments for providing one or more streams of digital content to a user. A request for content may be received by a video content provider from a client device. Digital content may be determined by the video content provider, encoded in a stream, and transmitted to the client device. The digital content may be determined based at least in part on a user and/or the client device requesting the digital content.

24 Claims, 8 Drawing Sheets

PERSONALIZED SMART-LIST VIDEO CHANNELS

BACKGROUND

Electronic commerce has expanded from the traditional sale of tangible products to the sale of digital content such as music, movies, and/or TV shows. Device diversification and user preferences hinder the ability to provide digital content capable of conforming to all devices and to all users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to determining and providing digital content to a user using a client device. Electronic commerce has expanded from the exclusive sale of tangible products to the sale of digital content such as music, movies, and/or TV shows. Yet, electronic commerce applications require substantial input from a user in order to preview, view, and/or purchase digital content, especially in light of users who are accustomed to less interactive user interfaces 272. For example, users of traditional television and/or set-top box devices may change the content presented to the user solely by changing a channel. Yet, a user may have to navigate complicated network pages in order to purchase digital content in an electronic commerce application. Moreover, device diversification and user preferences hinder the ability to provide a user interface capable of conforming to all devices and to all users. For example, different devices are capable of rendering different types of audio and/or video content. A video content provider may offer a choice between interactive user interfaces 272 and less interactive user interfaces 272 while conforming to user preferences and/or device capabilities.

In the following discussion, a general description of the system and its components is provided, followed by a discussion of the operation of the same.

Figure 1:
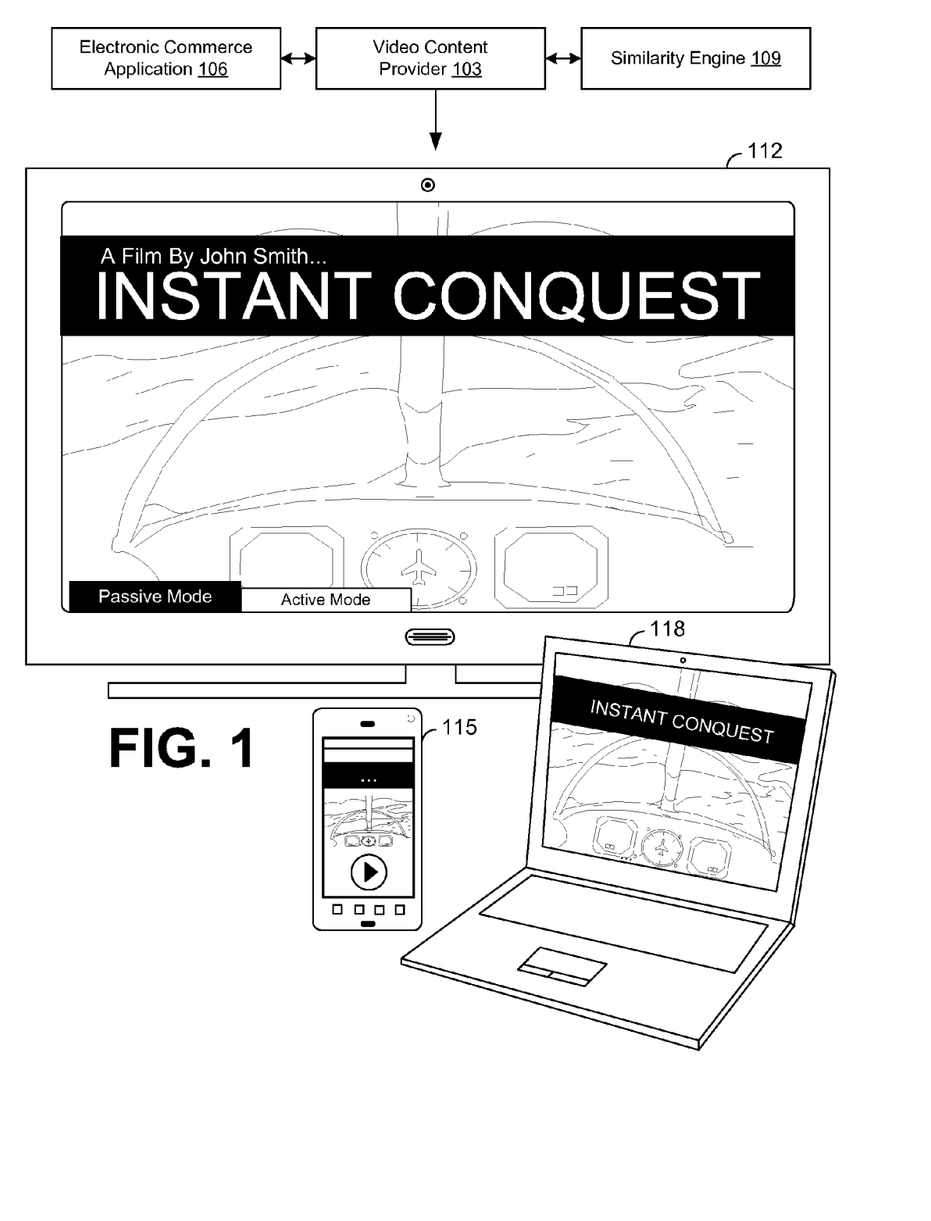
FIG. 1 is a drawing of an example of a user interface rendered by a plurality of client devices according to various embodiments of the present disclosure.

With reference to FIG. 1, shown is a stream of digital content rendered in a plurality of client devices. A video content provider 103 may communicate with an electronic commerce application 106 and a similarity engine 109 in order to provide digital content to a plurality of client devices. Client devices may include, for example, a television 112, a mobile device 115, and/or a computer 118. As may be appreciated, different client devices have different capabilities. For example, traditional televisions require interaction from a remote control in order to change a channel, adjust a volume, etc. In contrast, computers require interactions from at least one of a plurality of input devices (e.g., mouse, keyboard). Traditionally, in order to access digital content via an electronic commerce application 106, a user of a computer must navigate a user interface customary to computers. Suggested digital content is provided to the user in, for example, a grid or table in a network page. It may be beneficial instead to encode suggested content in a stream to be presented the user, lessening the required interaction from the user.

Next, a general description of a system for determining, encoding, and transmitting digital content over a network is provided, followed by a discussion of the operation of the same.

Figure 2:
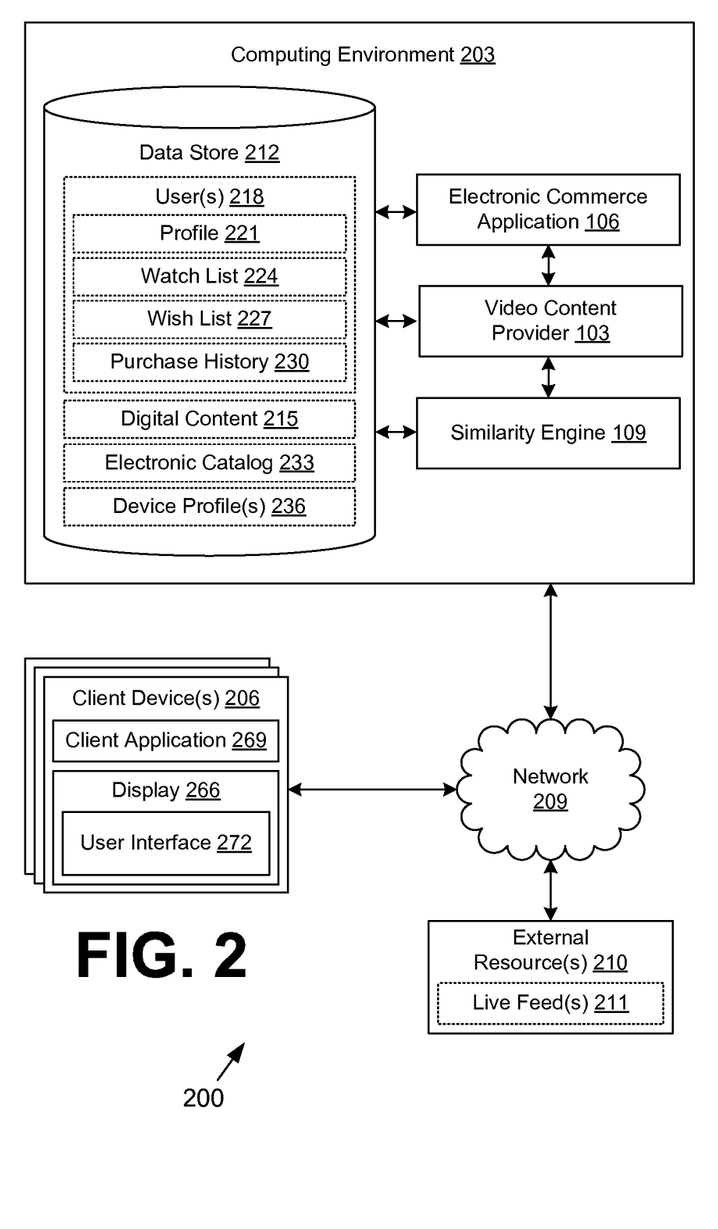
FIG. 2 is a drawing of a networked environment according to various embodiments of the present disclosure.

With reference to FIG. 2, shown is a networked environment 200 according to various embodiments. The networked environment 200 includes a computing environment 203, a client device 206, and external resources 208, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be employed that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a video content provider 103, an electronic commerce application 106, a similarity engine 109, and other applications, services, processes, systems, engines, or functionality not discussed in detail herein. The electronic commerce application 106 is executed in order to facilitate the online purchase of items over the network 209. The electronic commerce application 106 also performs various backend functions associated with the online presence of a merchant in order to facilitate the online purchase of items as will be described. For example, the electronic commerce application 106 generates network pages, such as web pages or other types of network content, that are provided to clients 206 for the purposes of selecting items for purchase, rental, download, lease, or other form of consumption as will be described.

The video content provider 103 is executed to identify, encode, and/or transmit a stream of digital content to a client device 206 based at least in part on a user requesting content and/or a client device 206. The video content provider 103 may access information associated with the client device 206 and/or the user from, for example, data store 212. The information may include the a required format for digital content of the client device, users' preferences for digital content, users' subscription levels, watch lists, wish lists, purchase history, and/or other information.

The video content provider 103 may communicate with the similarity engine 109 in order to determine which digital content 215 should be presented to the user. For example, the video content provider 103 may access a user's movie watch list and may communicate the watch list to the similarity engine 109 in order to determine one or more movies that are similar to movies residing in the user's watch list. Upon determination of one or more movies, the video content provider 103 may access one or more "movie previews" associated with the one or more movies as digital content 215 (e.g., audio and/or video data). Upon accessing the digital content 215, the video content provider 103 may store the data in one or more buffers to await encoding.

The video content provider 103 may encode the digital content 215 into one or more streams. Each stream may be accessed by a client application 269 as a "channel." For example, each channel may be associated with a genre associated with music or movies. Accordingly, "movie previews" of suggested movies determined by the similarity engine 109 may be encoded together to provide a user with a seamless stream of movie previews, arranged according to a requested channel. Various advertisements may be accessed by the video content provider 103 based at least in part on the user, the user's subscription level, and/or the client device 206. The advertisements may be encoded in the stream, for example, among the movie previews. Alternatively, the video content provider 103 may communicate with external resources 210 in order to access one or more live feeds 211. Live feeds 211 may include, for example, sporting events, concerts, news, and/or other network broadcasts. The live feeds 211 may be encoded in the stream, as may be appreciated.

The video content provider 103 may encode digital content 215 into a stream by converting the content from its stored or live feed format to a particular container format by utilizing a variety of codecs. Although encoding digital content 215 into a stream may result in compression of the original data, it is understood that the video content provider 103 may compress the audio and/or video content before conducting the encoding process. The type of codec used may depend on the client device 206 and/or capabilities of the client device 206. The video content provider 103 and/or the electronic commerce application 106 may transmit the stream to the client device 206 after encoding the digital content 215 in the stream.

The similarity engine 109 is executed to determine content for a user 218 based at least in part on information associated with the user and/or the user's profile 221. For example, a user's watch list 224, wish list 227, and/or purchase history 230, may have been associated with a user profile 221 and stored in data store 212. A user profile 221 may be used in determining which content to be encoded in the stream. For example, if a user orders a substantial number of action movies, a type of content (e.g., action movies) may be determined and movies similar to and/or related to the action movie genre may be determined and communicated to the video content provider 103. The video content provider 103 may subsequently access previews associated with the determined movies in order to encode the "movie previews" in one or more streams. Similarity among content may be determined by the similarity engine 109 based at least in part on similarities of musicians, actors, producers, directors, genres, keywords, descriptions, and/or any other information associated with items of digital content 215.

The data stored in the data store 212 includes, for example, data associated with users 218, digital content 215, an electronic catalog 233, device profiles 236, and potentially other data. Digital content 215 may comprise data associated with audio content (e.g., MP3's), video content (e.g., movies, TV shows), advertisements, and/or other digital data.

An electronic catalog 233 may comprise data regarding items offered for sale by one or more merchants to be sold in the electronic commerce application 106. An electronic catalog 233 may include many fields of data regarding each, such as, but not limited to, the following: title, description, brand, keywords, price, weight, shipping methods, related images, reviews, similar items, a list of merchants selling the item, stock number, unique identifiers, associated categories, purchase data, view data, etc. Data associated with a device profile 236 may be, for example, capabilities, components, resolution, and/or any other information associated with client devices 206.

The client 206 is representative of a plurality of client devices 206 that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include or be coupled to a display 266. The display 266 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application 269 and/or other applications. The client application 269 may be executed in a client 206, for example, to access network content served up by the computing environment 203 and/or other servers, thereby rendering a user interface 272 on the display 266. To this end, the client application 269 may comprise, for example, a browser, a dedicated application, etc., and the user interface 272 may comprise a network page, an application screen, etc. The client 206 may be configured to execute applications beyond the client application 269 such as, for example, email applications, social networking applications, word processors, spreadsheets, and/or other applications.

Next, a general description of the operation of the various components of the networked environment 200 is provided. To begin, it is understood that a request for a stream of content is received in the computing environment 203 from the client device 206 over network 209. As may be appreciated, a user 218 may access the electronic commerce application 106 in order to browse, purchase, and/or consume digital content 215. A request may comprise any information associated with the user 218 and/or the client device 206 utilized by the user 218 in attempting to consume the digital content 215.

Upon receipt of the request, various information associated with the client device 206 and/or the user 218 may be accessed by the video content provider 103. The information may include a required format for digital content 215 of the client device 206, a user profile comprising a user's preferences for digital content 215, a user's subscription level, a watch list 224, a wish list 227, purchase history 230, and/or other information.

The video content provider 103 may communicate with the similarity engine 109 in order to determine content to be presented to the user 218. The determination may be based at least in part on the user profile, the subscription level, and/or any other information accessed in association with a user 218 and/or a client device. For example, the similarity engine 109 may determine a plurality of movies associated with an "Action" movie genre to suggest to a user 218. The video content provider 103 may access digital content 215 (e.g., audio and/or video data) associated with the type of the content which may reside, for example, in data store 212. By accessing the digital content 215 data, the video content provider 103 may place the data in one or more buffers to await encoding.

The video content provider 103 may encode the digital content 215 into a stream. Encoding the audio and/or video content into a stream may comprise converting the content from its stored format to a particular container format utilizing a variety of codecs. Although encoding the audio and/or video content into a stream may result in compression of the original data, it is understood that the video content provider 103 may compress the audio and/or video content before conducting the encoding process. The type of codec used may depend on the client device 206 and/or capabilities of the client device 206. The encoded stream may be transmitted to the client device 206 via video content provider 103 and/or electronic commerce application 106. Upon receipt of the stream of encoded digital content 215, the client device 206 may decode the stream and render the stream to be shown in display 266.

Figure 3:
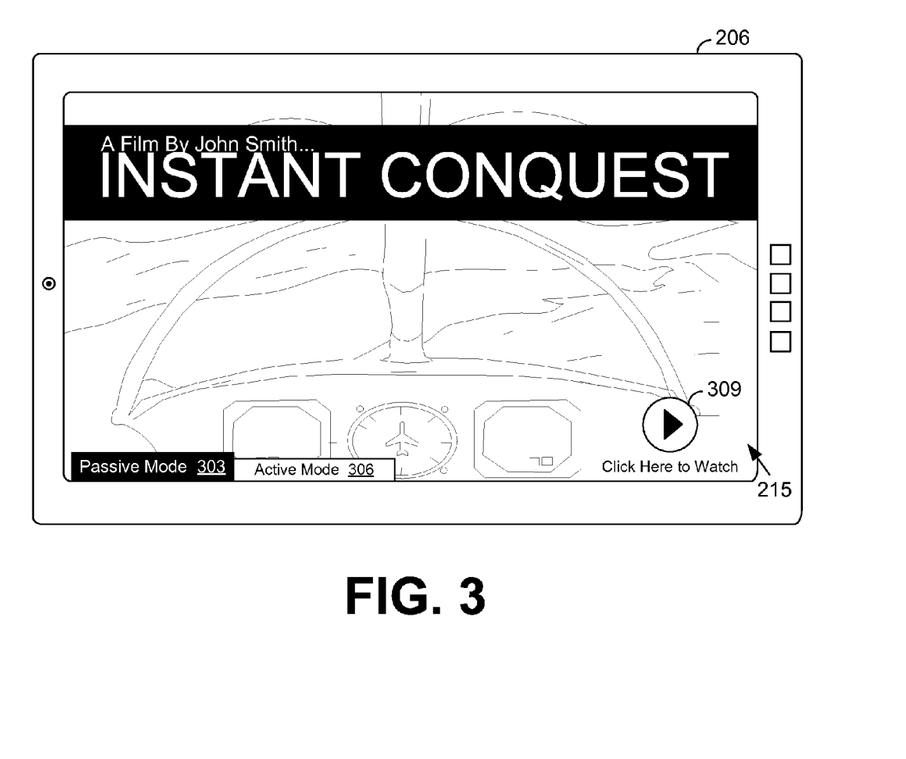
FIG. 3 is a drawing of an example of a user interface rendered by a client device in the networked environment of FIG. 2 according to various embodiments of the present disclosure.

Referring next to FIG. 3, shown is a non-limiting example of a stream of digital content 215 rendered in a client device 206 (FIG. 2), the client device 206 depicted as tablet computer. In this non-limiting example, a minimalistic user interface 272 (FIG. 2) may be rendered by the client device 206 on top of a stream of digital content 215 provided by the video content provider 103 (FIG. 1) over a network 209 (FIG. 2). The stream of digital content 215 depicts a "movie trailer" which comprises audio and video, as may be appreciated. A user 218 (FIG. 2) may engage two modes of user interfaces 272, passive (via component 303) or active (via component 306). The depicted "passive mode" shows the stream of digital content 215, requiring little interaction by the user 218. For example, a user 218 does not have to navigate a network page full of suggested movies. Instead, a user 218 may engage a mechanism (component 309) to initiate purchase of an item of digital content 215. In the non-limiting example of FIG. 3, a user 218 may engage component 309 to initiate a rental or purchase of the movie "Instant Conquest," as may be appreciated.

Figure 4:
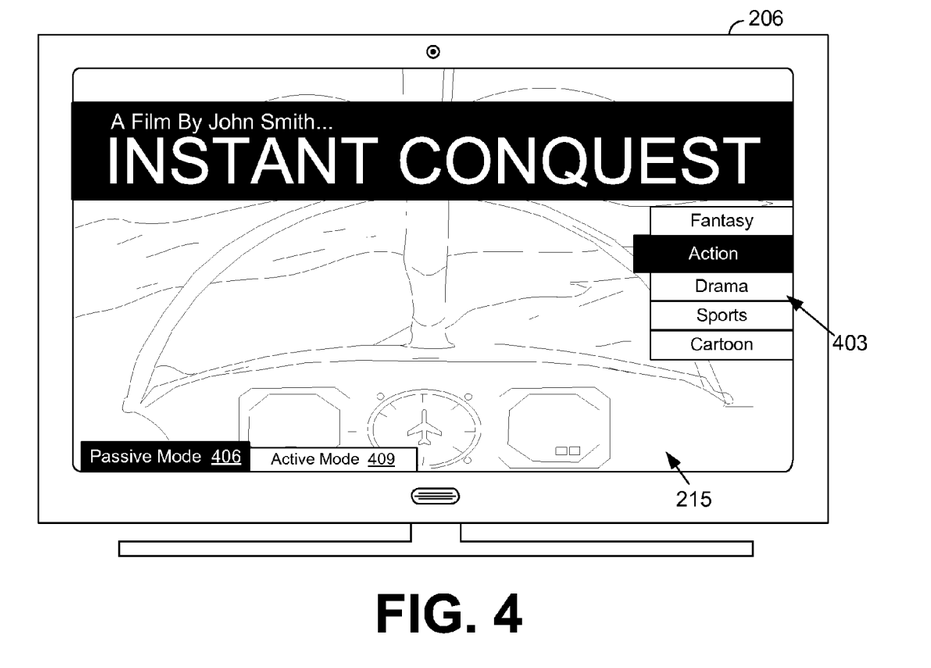
FIG. 4 is a drawing of an example of a user interface rendered by a client device in the networked environment of FIG. 2 according to various embodiments of the present disclosure.

Turning now to FIG. 4, shown is a non-limiting example of a stream rendered in a client device 206 (FIG. 2) depicted as a television. In this non-limiting example, a minimalistic user interface 272 (FIG. 2) may be rendered by the client device 206 on top of a stream of digital content 215 provided by the video content provider 103 (FIG. 1) over a network 209 (FIG. 2). The user interface 272 of FIG. 4 depicts a channel mechanism 403 which may be used to alternate between streams of content. A channel mechanism 403 may utilize various labels to classify the streams. For example, the channels may be labeled: Fantasy, Action, Drama, Sports, and Cartoon. Upon accessing a channel, a request for content may be transmitted to the video content provider 103. Similar to FIG. 3, the stream of digital content 215 of digital content 215 depicts a "movie trailer" which comprises audio and video, as may be appreciated. The instant movie is accessed through the "Action" channel, thus the stream comprises movie trailers associated with an action genre.

In the non-limiting example of FIG. 4, a user 218 (FIG. 2) may engage two modes of user interfaces 272, passive (via component 406) or active (via component 409). The depicted "passive mode" shows the stream of digital content 215, requiring little interaction by the user 218. Although some televisions are not traditionally capable of connection to a network, "smart" televisions can be capable of running client applications 269 (FIG. 2) that communicate over a network 209. Other devices (e.g., gaming consoles, DVD players) may be used in accessing the one or more streams in order to render the stream in an archaic television.

Figure 5:
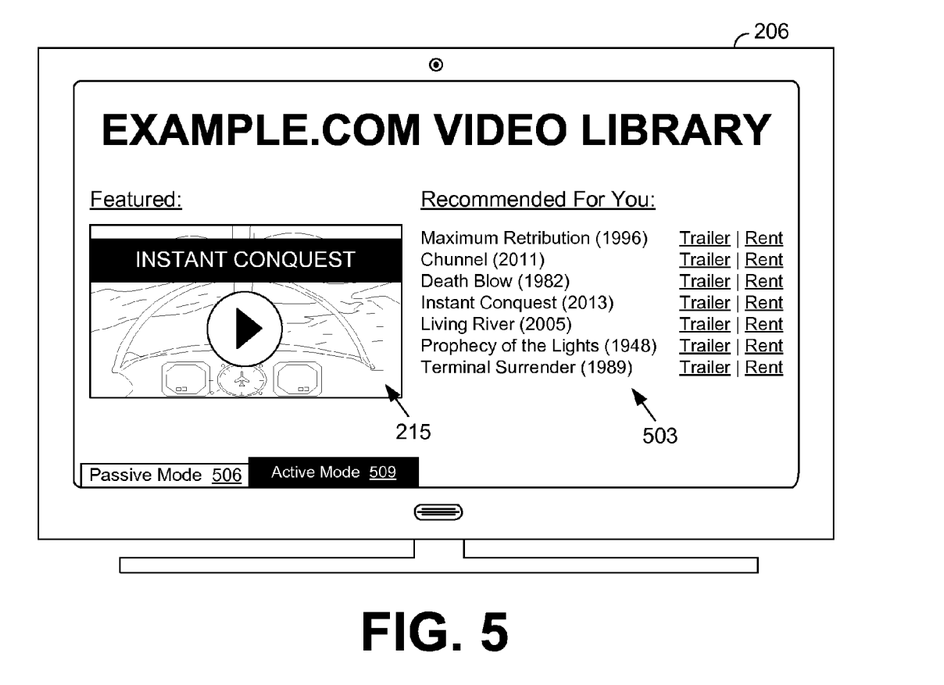
FIG. 5 is a drawing of an example of a user interface rendered by a client device in the networked environment of FIG. 2 according to various embodiments of the present disclosure.

Moving on to FIG. 5, shown is a non-limiting example of a stream rendered in a client device 206 (FIG. 2) depicted as a television. In this non-limiting example, a network page may be rendered by the client device 206, wherein the network page comprises a stream of digital content 215 provided by the video content provider 103 (FIG. 1) over a network 209 (FIG. 2). The network page of FIG. 5 depicts an active user interface 272 (FIG. 2) comprising more information, thus requiring more interaction from a user 218. A recommendation mechanism 503 may suggest various movies generated by the similarity engine 109 (FIG. 1). Similar to FIG. 3, the stream of digital content 215 of digital content 215 depicts a "movie trailer," or other preview associated with media content, which comprises audio and video, as may be appreciated.

Similar to FIGS. 3 and 4, a user 218 may engage two modes of user interfaces 272, passive (via component 506) or active (via component 509). The depicted "active mode" shows the stream of digital content 215 in the user interface 272, yet more data is presented to the user 218 and more interaction is required by the user 218 to initiate a purchase. Although the active mode requires more interaction, it is understood that users 218 may prefer an active mode over a passive mode. Accordingly, different modes of user interfaces 272 requiring various levels of interaction may be provided. Moreover, FIG. 5 illustrates that a stream may be transmitted to and/or rendered by client device 206 in either a full screen mode (e.g., FIG. 4) or in a minimized form.

Figure 6:
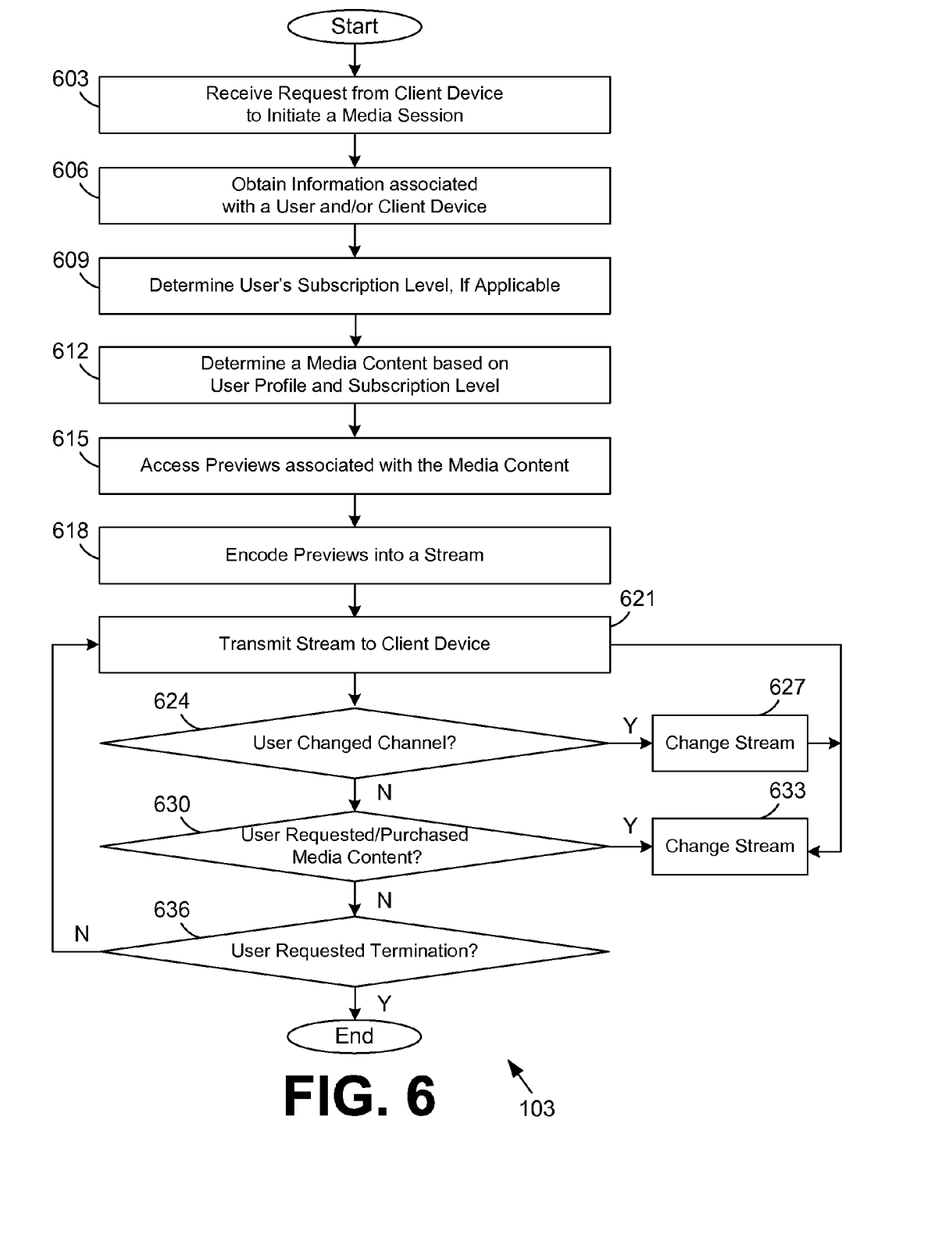
FIG. 6 is a flowchart illustrating one example of functionality implemented as portions of a video content provider executed in a computing environment in the networked environment of FIG. 2 according to various embodiments of the present disclosure.

Referring next to FIG. 6, shown is a flowchart that provides one example of the operation of a portion of the video content provider 103 according to various embodiments. It is understood that the flowchart of FIG. 6 provides merely an example of the many different types of functional arrangements that may be employed to implement the operation of the portion of the video content provider 103 as described herein. As an alternative, the flowchart of FIG. 6 may be viewed as depicting an example of steps of a method implemented in the computing environment 203 (FIG. 2) according to one or more embodiments.

Beginning with box 603, a request is received by the video content provider 103 to initiate a media session. A media session may comprise, for example, a connection between the client device 206 and computing device 206, whereby the computing device 206 streams media content and/or digital content 215 to the client device 206. As may be appreciated, a user 218 may access an electronic commerce application 106 or other network application in order to browse, purchase, and/or consume digital content 215. In one embodiment, upon a launch of a network application in a client device 206 (FIG. 2), a request for the audio and/or video content may be automatically transmitted to the video content provider 103, without any interaction required from a user 218. In another embodiment, the request may be transmitted upon an occurrence of a condition or event in the network application. The request may comprise any information associated with the user 218, the user's preferences, and/or the client device 206 utilized by the user 218 in attempting to access the network application.

In box 606, information associated with the client device 206 and/or the user 218 may be accessed or obtained. Information associated with the client device 206 may be beneficial in determining of a type of a codec used to encode and/or decode the audio and/or video content. Additionally, information associated with the user 218 may be beneficial in determining which content to encode to provide the content to the user 218. In order to browse, view, and/or purchase content on the network application and/or client application 269, authentication may be required. For example, the client application 269 may require a user 218 to provide a username and password in order to associate the device with a user account. The user account and/or the client device 206 may be associated with a subscription. For example, a user 218 may have purchased a subscription in order to access premium content and/or reduce the number of advertisements placed in the content. Accordingly, information associated with the user 218 and/or the user's device may be stored and/or accessed in association with a user profile 221.

A determination may be made whether a user profile 221 exists that is associated with the user 218 and/or client device 206. For example, a user profile 221 may have been previously created when a user 218 subscribed to a service and/or purchase an item on an electronic commerce application 106. As may be appreciated, if a user profile 221 does not exist, a user profile 221 may be generated based at least in part on the information associated with the user 218 and/or the client device 206. Alternatively, an existing user profile 221 may be accessed, modified and/or obtained as needed. Modification may comprise associating the account with a new client device 206.

In box 609, a subscription level associated with the user 218 may be determined, if applicable. For example, a user 218 may pay a monthly fee in order to gain access to premium content lacking any advertisements and/or commercials. The subscription may be associated with the user 218 account, as may be appreciated. Alternatively, a user 218 may have a basic subscription level for a nominal fee that may limit the content available to the user 218 and/or may affect the placement of advertisements within the content. The subscription level may be used in determining the placement of advertisements, access to certain content, and/or the type of content presented to the user 218.

Moving on to box 612, content to be presented to the user 218 may be determined based at least in part on the user profile 221, the subscription level, the client device 206, a request made by the user 218, and/or any other information. The content may be digital content 215, media content, and/or any other content. For example, if a user 218 orders a substantial number of action movies, a type of content (e.g., action movies) may be determined and movies similar to and/or related to the action movie genre may be determined. Similarity among content may be determined by the similarity engine 109 based at least in part on similarities of musicians, actors, producers, directors, genres, keywords, descriptions, and/or any other information associated with items of digital content 215. Additionally, the user 218 may submit a request for a particular type of content. For example, a user 218 may access a channel related to a particular type of content. Accordingly, the content determined may be related to the particular type of content indicated in the request.

In box 615, previews associated with the content determined in box 612 may be accessed. For example, a determination in box 612 may have resulted in a list of movies to suggest to the user. Various movie trailers (i.e., previews) associated with the movies in the list may be obtained. Furthermore, accessing the digital content 215 and/or media content may comprise placing the content in one or more buffers to await encoding, as may be appreciated. For example, the video content provider 103 may access previews associated with the determined movies in order to encode the "movie previews" in one or more streams.

In box 618, the previews corresponding to the digital content 215 may be encoded into a stream. For example, the audio and/or video components of the digital content 215 may be encoded into a stream by converting the content from its stored format to a particular container format utilizing a variety of codecs. Container formats may include, but are not limited to, MPEG, MPEG-4, MP3, AVI, FLV, etc. Although encoding the digital content 215 into a stream may result in compression of the original data, it is understood that the video content provider 103 may compress the audio and/or video content before conducting the encoding process. The type of codec used may depend on the client device 206 and/or capabilities of the client device 206. In box 621, the encoded stream may be transmitted to the client device 206. In an alternative embodiment, one or more encoded files may be transmitted in place of a stream.

Next, in box 624, the video content provider 103 may determine whether a user changed a channel. A channel may be associated with an identifier, as depicted in FIG. 4. For example, channels may be labeled in association with a genre, although channels may be labeled in association with our subjects. Upon changing a channel, a channel change request may be submitted to the video content provider 103 from the client device 206, in box 627. The video content provider 103, upon receipt of the request, may change the content encoded in the stream and/or encode a separate stream to transmit to the client 206.

Similarly, in box 630, the video content provider 103 may determine whether a user has requested to access and/or purchase digital content 215. For example, while viewing a preview of a movie, a user may engage a component of the client application 269 to initiate access and/or purchase to content associated with the preview being shown. If a user has a subscription, for example, the user may not have to make a purchase to access the media content. Upon receipt of the viewing request (e.g., the request to view the media content) or a purchase request (e.g., the request to purchase or rent the media content), the video content provider 103 may change the content encoded in the stream to be the media content associated with the preview, in box 633. For example, if a user 218 engages a purchase component while watching a movie preview corresponding to "Instant Conquest," the full feature fill of "Instant Conquest" may be accessed and encoded in the stream. Upon receipt of a request for a new stream, in box 621, the stream may be transmitted to the client device.

As may be appreciated, a stream of previews may continue to be transmitted and rendered in the client device 206 until a termination request is received from the client device 206. Accordingly, in box 636, a determination is made whether a user has requested termination. If so, the stream may cease to transmit. If the user has not requested a termination of the stream, the stream may continue to be transmitted and/or rendered in the client device 206. For example, when a user of a client device 206 closes out of a client application 269, a termination request may be transmitted from the client device 206 to the computing device 203 transmitting the stream. Similarly, if an error has been detected during receipt of the stream on the client device 206, a termination request may be received from the client device 206.

Figure 7:
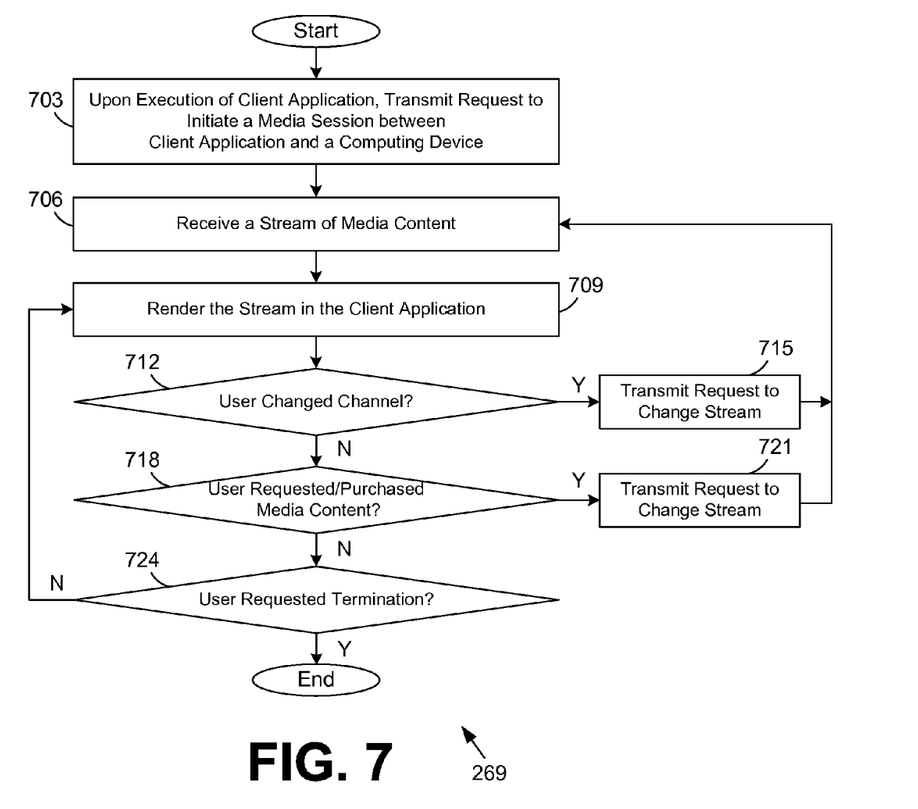
FIG. 7 is a flowchart illustrating one example of functionality implemented as portions of a client application in communication with a video content provider, executed in a computing environment in the networked environment of FIG. 2 according to various embodiments of the present disclosure.

Referring next to FIG. 7, shown is a flowchart that provides one example of the operation of a portion of the client application 269 in communication with the video content provider 103 (FIG. 2) over network 209 (FIG. 2) according to various embodiments. It is understood that the flowchart of FIG. 7 provides merely an example of the many different types of functional arrangements that may be employed to implement the operation of the portion of the client application 269 or the video content provider 103 as described herein. As an alternative, the flowchart of FIG. 7 may be viewed as depicting an example of steps of a method implemented in a client device 206 (FIG. 2) according to one or more embodiments.

Beginning with box 703, a request for a stream of content is transmitted from the client device 206 to the video content provider 103 over network 209. As discussed above with respect to FIG. 6, a user 218 may access an electronic commerce application 106 or other network application in order to browse, purchase, and/or consume digital content 215. In one embodiment, upon a launch of a network application in a client device 206 (FIG. 2), a request for the audio and/or video content may automatically be transmitted from the client device 206 to the video content provider 103 without interaction being required from a user 218. In another embodiment, a request may be made based at least in part on a channel selected by a user 218 of the client application 269. For example, a channel may be associated with a genre and a request may comprise the type of channel requested. Accordingly, the request may comprise any information associated with the user 218 and/or the client device 206 utilized by the user 218 in attempting to access the network application. Authentication may be required before the request for the stream of content is transmitted. For example, the client application 269 may require a user 218 to provide a username and password in order to associate the device with a user 218 account.

In box 706, a stream of encoded digital content 215 is received by the client device 206 from the video content provider 103. The client application 269 and/or other software or hardware in the client device 206 may make a determination whether the client device 206 supports the transmitted audio and/or video content. If the client device 206 does not support the transmitted audio and/or video content, the client device 206 may be configured to convert the content to a predefined format, if necessary. If the client device 206 supports the transmitted audio and/or video components of the digital content 215, the stream may be uninhibited by the client application 269 and/or the client device 206 with the exception of decoding the content.

In box 709, the stream may be rendered on a display 266 of the client device 206. In box 712, the client application 269 may determine whether a user changed a channel. For example, a user may have engaged a component within the client application 269 used to select a channel. Upon detection of an engagement of the component, in box 715, a channel change request may be transmitted to the video content provider 103 from the client device 206. The video content provider 103, upon receipt of the request, may change the content encoded in the stream and/or encode a separate stream to transmit to the client 206.

Similarly, in box 718, the client application 269 may determine whether a user has requested to access and/or purchase digital content 215. For example, while viewing a preview of a movie, a user 218 may engage a component of the client application 269 to initiate access and/or purchase to content associated with the preview being shown. If a user has a subscription, for example, the user may not have to make a purchase to access the media content. In box 721, a viewing request (e.g., the request to view the media content) or a purchase request (e.g., the request to purchase or rent the media content) may be transmitted to the video content provider 103. The client device 206 may receive the altered and/or different stream. For example, if a user 218 engages a purchase component while watching a movie preview corresponding to "Instant Conquest," the full feature fill of "Instant Conquest" may be accessed and encoded in the stream by the video content provider 103 and transmitted to the client device 206. Upon receipt of a modified and/or new stream, in box 709, the stream may be rendered in the client device.

As may be appreciated, a stream of previews may continue to be transmitted and rendered in the client device 206 until a termination request is received from the client device 206. Accordingly, in box 724, a determination is made whether a user has requested termination. If so, the stream may cease to transmit. If the user has not requested a termination of the stream, the stream may continue to be transmitted and/or rendered in the client device 206. For example, when a user of a client device 206 closes out of a client application 269, a termination request may be transmitted from the client device 206 to the computing device 203 transmitting the stream. Similarly, if an error has been detected during receipt of the stream on the client device 206, a termination request may be transmitted from the client device 206 to the computing device 203 transmitting the stream.

Figure 8:
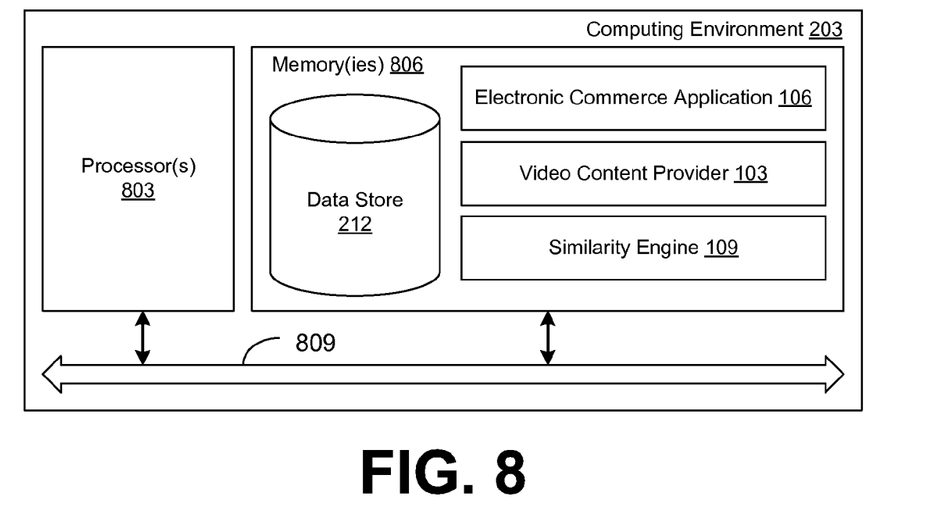
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices. Each computing device includes at least one processor circuit, for example, having a processor 803 and a memory 806, both of which are coupled to a local interface 809. To this end, each computing device may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the electronic commerce application 106, the video content provider 103, the similarity engine 109, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the electronic commerce application 106, the video content provider 103, the similarity engine 109, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6 and 7 show the functionality and operation of an implementation of portions of the video content provider 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 106, the video content provider 103, the similarity engine 109, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having computer-readable program code executable by at least one computing device, wherein the computer-readable program code, when executed, causes the at least one computing device to:
 receive a request to initiate a media session from a client application executed on a client device for a first media channel, the media session personalized for the client device and for a user profile of the client device;
 access information associated with the user profile of the client device to identify a consumption history for the user profile comprising a plurality of items consumed by a user in an electronic commerce application;
 determine a subscription level corresponding to the user profile;
 determine media content to be consumed at the client device based at least in part on the user profile, the first media channel, the consumption history, and the subscription level;
 access at least one preview associated with the media content and encodes the at least one preview into a first stream according to a predefined format associated with the client device;
 transmit the first stream to the client device to be rendered on a display in association with the first media channel on the client device;
 initiate a viewing of the first stream on the client device in response to a viewing request received from the client device; and
 initiate a transition from a transmission of the first stream rendered on the display in association with the first media channel to the transmission of a second stream associated with a second media channel in response to a change transmission request received from the client device, the second stream comprising a different preview associated with different media content determined based at least in part on the user profile, the second media channel, and the subscription level, the change transmission request transmitted-in response to an engagement of a change channel component on the client device.

2. The non-transitory computer-readable medium of claim 1, wherein the consumption history for the user profile further comprises a media content consumption history corresponding to the user.

3. The non-transitory computer-readable medium of claim 1, wherein the media content and at least one advertisement are encoded into the first stream according to a predefined format, the predefined format determined according to a capability of the client device.

4. The non-transitory computer-readable medium of claim 1, wherein the computer-readable program code, when executed, further causes the at least one computing device to initiate a purchase of the media content via the electronic commerce application in response to a purchase request received from the client device, the purchase request for the media content corresponding to the at least one preview being rendered on the client device.

5. A system, comprising:
 at least one computing device; and
 a media content provider application executable in the at least one computing device, the media content provider application comprising logic that:
  receives a request to initiate a media session from a client application executed on a client device, the media session personalized for the client device and for a user profile associated with the client device;
  determines media content based at least in part on information associated with the user profile;
  accesses at least one preview associated with the media content and encodes the at least one preview into a first stream;
  transmits the first stream to the client device to be rendered on a display on the client device; and
  initiates a transition from a transmission of the first stream rendered on a display of the client device in association with a first media channel to the transmission of a second stream associated with a second media channel in response to a change transmission request received from the client device, the second stream comprising a different preview associated with different media content determined based at least in part on the user profile and the second media channel, the change transmission request transmitted in response to an engagement of a change channel component on the client device.

6. The system of claim 5, wherein the change transmission request is transmitted upon an engagement of a change channel component on the client device.

7. The system of claim 5, wherein the information associated with the user profile further comprises a watch list corresponding to a user of the client device.

8. The system of claim 5, wherein the information associated with the user profile further comprises a content consumption history corresponding to a user of the client device.

9. The system of claim 5, wherein the media content provider application further comprises logic that:
 accesses a live feed of digital content; and
 encodes the live feed of digital content into the first stream or the second stream.

10. The system of claim 5, wherein the media content provider application further comprises logic that:
 determines a subscription level corresponding to the user profile; and
 determines the media content based at least in part on the information associated with the user profile and the subscription level.

11. The system of claim 10, wherein the media content provider application further comprises logic that encodes an advertisement into the first stream or the second stream, the advertisement selected based at least in part on the information associated with the user profile and the subscription level.

12. The system of claim 5, wherein the media content provider application further comprises logic that:

encodes the first stream or the second stream in a user interface; and transmits the user interface to the client device.

13. The system of claim 12, wherein the media content provider application further comprises logic that encodes a recommendation associated with the media content in the user interface.

14. A computer-implemented method, comprising:
receiving, by at least one computing device, a request to initiate a media session from a client application executed on a client device, the media session personalized for the client device and for a user profile associated with the client device, the request designating at least one of a plurality of user interfaces associated with the media session;
determining, by the at least one computing device, media content based at least in part on information associated with the user profile;
accessing, by the at least one computing device, at least one preview associated with the media content and encoding the at least one preview into a stream;
encoding, by the at least one computing device, the stream in the at least one of the user interfaces designated in the request;
transmitting, by the at least one computing device, the at least one of the user interfaces to the client device comprising a component to view the stream on the client device;
initiating, by the at least one computing device, a transition from the one of the user interfaces rendered on a display of the client device received in the request to a second one of the user interfaces having a second stream comprising a different preview associated with different media content determined based at least in part on the user profile; and
transmitting, by the at least one computing device, the second one of the user interfaces to the client device comprising another component to view the stream.

15. The computer-implemented method of claim 14, further comprising initiating, by the at least one computing device, a viewing of the media content on the client device in response to a viewing request received from the client device, the viewing request associated with the media content being rendered on the client device.

16. The computer-implemented method of claim 14, further comprising initiating, by the at least one computing device, a purchase of the media content on the client device in response to a purchase request received from the client device, the purchase request for the media content corresponding to the at least one preview being rendered on the client device.

17. The computer-implemented method of claim 14, wherein the information associated with the user profile further comprises a content consumption history corresponding to a user of the client device.

18. The computer-implemented method of claim 14, further comprising:
accessing, by the at least one computing device, a live feed of digital content; and
encoding, by the at least one computing device, the live feed into the stream.

19. The computer-implemented method of claim 18, further comprising encoding, by the at least one computing device, a recommendation associated with the media content in the one of the user interfaces received in the request or the second one of the user interfaces.

20. The computer-implemented method of claim 14, further comprising:
determining, by the at least one computing device, a subscription level corresponding to the user profile; and
determining, by the at least one computing device, the media content based at least in part on the information associated with the user profile and the subscription level.

21. The computer-implemented method of claim 19, further comprising encoding, by the at least one computing device, an advertisement selected based at least in part on the information associated with the user profile and the subscription level.

22. A computer-implemented method, comprising:
transmitting, by a client device comprising memory and at least one hardware processor, a request to initiate a media session between a client application executable on the client device and a media content provider application executable on a remote computing device, the media session being associated with a media channel and being personalized for the client device and for a user profile associated with the client device, wherein the media content provider application executable on the remote computing device is configured to:
generate a first stream of previews of media content and a second stream of previews of different media content; and
determine whether to communicate the first stream of previews or the second stream of previews to the client device based at least in part on the media channel associated with the media session; and
receiving, by the client device, the first stream of previews or the second stream of previews from the remote computing device;
rendering, by the client device, the first stream of previews in the client application in a display on the client device;
transmitting, by the client device, a stream change request for a transition from the first stream of previews to the second stream of previews in response to an engagement of a change channel component within the client application; and
transmitting, by the client device, a viewing request for a transition from the first stream of previews or the second stream of previews to a third stream comprising the media content in response to an engagement of a viewing component within the client application.

23. The computer-implemented method of claim 22, further comprising transmitting, by the client device, a purchase request for a purchase of the media content associated with a respective preview in order to transition from the first stream of previews or the second stream of previews to the third stream comprising the media content in response to an engagement of a purchase component associated with the client application.

24. The computer-implemented method of claim 22, wherein the request in transmitted in response to an execution of the client application.

* * * * *